United States Patent

[11] 3,614,627

[72] Inventors Raymond A. Runyan
Wilton;
Owen J. Ott, Brookfield, both of Conn.
[21] Appl. No. 767,628
[22] Filed Oct. 15, 1968
[45] Patented Oct. 19, 1971
[73] Assignee Data-Control Systems, Inc.
Danbury, Conn.

[54] UNIVERSAL DEMODULATION SYSTEM
25 Claims, 3 Drawing Figs.

[52] U.S. Cl. ........ 325/345, 325/432, 325/433, 325/436, 329/153
[51] Int. Cl. ........ H04b 1/06
[50] Field of Search ........ 325/344, 345, 346, 442, 430–438, 452, 453, 457, 472, 473, 474, 477, 479, 480, 481, 489; 329/154; 324/79; 327/153

[56] References Cited

UNITED STATES PATENTS

| | | | |
|---|---|---|---|
| 3,054,057 | 9/1962 | Bettin et al. | 325/436 |
| 3,409,836 | 1/1968 | Wallett | 325/433 |
| 3,414,821 | 12/1968 | Bickers et al. | 325/433 |
| 3,433,903 | 3/1969 | Murray et al. | 325/432 |

*Primary Examiner*—Robert L. Griffin
*Assistant Examiner*—Albert J. Mayer
*Attorney*—Joseph Weingarten

ABSTRACT: An FM demodulation system useful to demodulate any carrier signal of any deviation within prescribed ranges with unitary apparatus. A plurality of band pass filters is employed, each filter having a predetermined bandwidth, and selected filters are operatively arranged with a plurality of frequency translators such that an input signal can be heterodyned to the center frequency of the filter having the requisite bandwidth for the deviation of the particular input signal.

INVENTORS
RAYMOND A. RUNYAN
OWEN J. OTT
BY Joseph Weingarten
Stanley M. Schurgin
ATTORNEYS

INVENTORS
RAYMOND A. RUNYAN
OWEN J. OTT
BY
ATTORNEYS

INVENTORS
RAYMOND A. RUNYAN
OWEN J. OTT
BY Joseph Weingarten
Stanley M. Schurgin
ATTORNEYS

UNIVERSAL DEMODULATION SYSTEM

FIELD OF THE INVENTION

This invention relates to electronic systems and more particularly to demodulation systems useful to demodulate a variety of carrier signal formats.

BACKGROUND OF THE INVENTION

FM telemetry systems are widely employed to transmit data to or from a remote site. For example, in the command and control of missiles and satellites, telemetry links are provided to convey data from a ground station to the vehicle and to relay data from the vehicle back to the ground station. Remote operation and monitoring of industrial plants such as refineries and power generating stations also employ telemetry links to convey data to and from a control station. Data representing many different items is usually transmitted and a plurality of multiplexed channels are usually employed to accommodate such data. Each data channel can have a different deviation suitable for the particular data to be conveyed; thus, to demodulate such data, individual demodulators must be provided for each channel and each demodulator must be tunable to a range of deviations in order to properly decode the received information. Conventionally, individual tuning units have been employed in subcarrier discriminators, each tuning unit being operative for a single channel or a small group of channels and being adjustable for a range of deviations. With the large number of channels commonly employed in FM telemetry, many individual tuning units are necessary and the storage and calibration problems associated with the use of separate tuning units render such conventional apparatus cumbersome and economically inefficient. In addition, the tuning units by their nature are rather complex and must be carefully constructed and calibrated to achieve the intended performance. In accordance with the present invention, a unitary system is provided in which any channel and deviation within predetermined ranges can be selectively demodulated in an extremely effective manner and with minimum distortion.

SUMMARY OF THE INVENTION

Briefly, the invention comprises a novel programmable frequency translation system wherein a plurality of fixed band pass filters are arranged to provide frequency translation with minimum distortion. The invention is especially useful in a universal FM demodulator, but is not limited to such use. Rather, the invention is broadly useful in many applications requiring versatile, high-performance frequency translation, such as in spectrum analysis.

As embodied in an FM demodulation system, the invention is capable of demodulating a wide range of carrier signals and deviations. A plurality of fixed band-pass filters is employed, each filter having a bandwidth suitable to accommodate the deviation of a signal which may be detected. Selected filters are arranged in operative association with a plurality of frequency translators such that an input signal to be demodulated can be heterodyned to the center frequency of the band-pass filter having the requisite bandwidth for the deviation of the particular input signal. It is a feature of this invention that the filter bandwidths and translation frequencies are interrelated such that a signal can be translated from an initial frequency to a final frequency with little distortion and without the problem of spectrum folding.

The elimination of spectrum folding is especially important in telemetry systems wherein a group of modulated subcarriers is usually multiplexed on a main carrier. It will be appreciated that translation of any of these subcarriers can cause image components which are of frequencies within the telemetry channels. According to the present invention, spectrum folding problems are eliminated by utilizing band limited signals throughout the system and by multiple frequency translation of these band limited signals.

Considering the invention, as embodied in an FM demodulation system, in greater detail, a plurality of frequency translator stages are provided, each stage having a group of band-pass filters and a mixer. The bandwidths of the filters within each group are interrelated by a ratio $M^{1/n}$, the number $n$ being determined by the desired selectivity, as will be explained, while the center frequency of the filters of a group are related to the center frequency of an adjacent group by a factor M. The band-pass filters of each group can be selectively connected to the mixer of the respective stage, the mixer being operative, in response to a reference signal of predetermined relation to the center frequency of its translator stage, to heterodyne the band limited output signal of the stage to a frequency suitable to drive the succeeding stage. Each translator stage can, therefore, drive a succeeding stage, and the interrelationship between filter band-widths and the translator frequencies permits the translator stages to be selectively interconnected to suitably process any of a large number of input signals to be demodulated. An input signal is translated in frequency a number of times necessary to direct the signal to a filter having the requisite bandwidth for the deviation of the particular input signal. A particular input signal therefore, depending on its frequency, is processed by one or more stages of frequency translation and band-pass filtering, and experiences a polarity reversal with each stage of processing. Further processing of the signal includes logic circuitry for automatically controlling the polarity such that an output signal of uniform polarity is produced irrespective of the number of translator stages employed in a given instance.

After processing by the filter having the bandwidth corresponding to the input signal deviation, the signal is limited and detected to produce the intended demodulated output signal. Detection is accomplished by a phase detector operating in a phase-lock loop, the loop characteristics being controllably by logic circuitry to provide performance suitably for a particular processing mode. Telemetry data is often demodulated from a magnetic tape recorded signal and the phase-lock loop is also adjustably in frequency to compensate for frequency variation due to flutter of the tape transport.

Selection of the translator stages of the filters within each stage suitably for a particular input signal is also accomplished by control logic which can be energized manually or by computer. In the manual mode of operation, selector switches can be set to represent the carrier frequency and deviation to be processed. Such manual selection causes the control logic to interconnect those system elements necessary for the selected input conditions. In similar manner, the control logic can be commanded by instructions from a suitably programmed computer to effect the requisite connections.

DESCRIPTION OF THE DRAWINGS.

The invention will be more fully understood from the following detailed description, taken in conjunction with the accompanying drawings, in which.

DETAILED DESCRIPTION OF THE INVENTION

Figure 1:
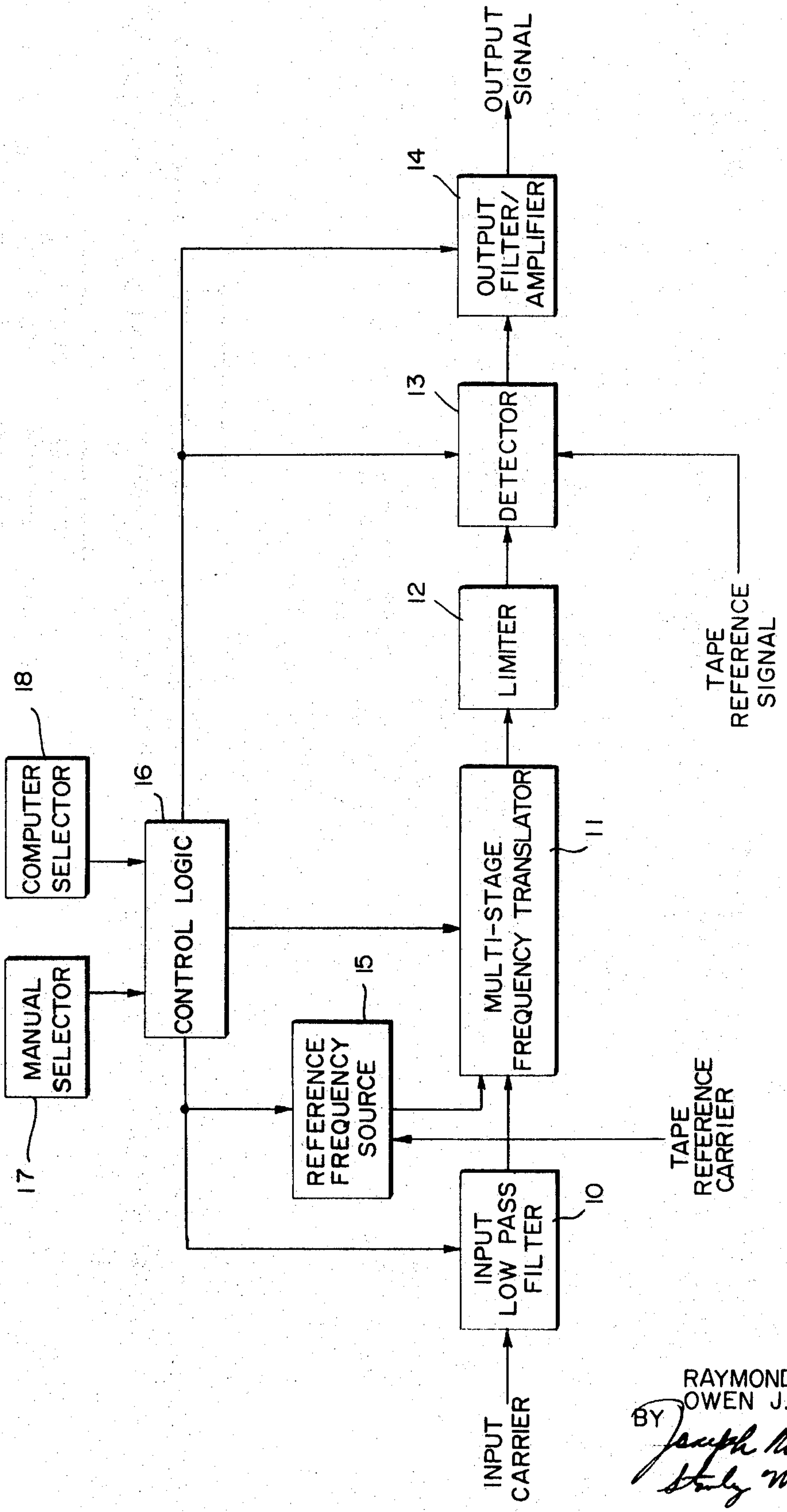
FIG. 1 is a diagrammatic representation of a demodulator according to the invention.

An FM demodulator embodying the invention and operative to detect any FM channel and signal deviation within a predetermined frequency range is illustrated in FIG. 1. The system includes an input low-pass filter 10 having its output coupled to the input of a multistage frequency translator 11, the output of which is connected to a limiter 12 and thence to a detector 13. The detector output is further processed in filter/amplifier 14 to provide the intended output signal. A reference frequency source 15 is connected to an input of frequency translator 11 and provides a master reference frequency, and control logic 16 is connected to input filter 10, translator 11, detector 13 and filter/amplifier 14 to control system operation in a manner to be explained hereinbelow. Control logic 16 is operative according the input conditions determined by a manual selector 17 or a computer selector 18.

An input signal to be demodulated is applied to input filter 10, the characteristics of this filter being controlled by control logic 16 to provide filter characteristics suitable for the particular input signal. The present system employs a novel multiple frequency translation to accomplish the intended signal processing and it is a particular feature of the invention that such multiple translation is accomplished in a manner such that images and distortion components are maintained at a minimum . The input filter 10 is a programmable low-pass filter which is operative to reduce image generating components of the input signal spectrum before the translation process commences. The multistage frequency translator 11 includes, in each stage, a group of band-pass filters and an associated mixer, one input of the mixer being the signal from a selected one of the band pass and the other mixer input being a signal derived from reference frequency source 15. The mixer output is applied to a selected one of the group of band-pass filters of the succeeding stage, the output frequency of the mixer being suitable for the frequency of the succeeding stage. As will be explained more particularly below, the center frequencies of the band-pass filters of each stage are interrelated by a factor M, and at each center frequency there are *n* band-pass filters whose bandwidths differ by a ratio of $M^{1/n}$, the integer *n* depending upon the desired selectivity of the filters. In the illustrated system, the integers M and *n* each equal 2 thus, the center frequency of each translator stage differs from the frequency of each adjacent stage by one octave. Two band-pass filters are employed in each translator stage, the bandwidths of the filters in each differing by $\sqrt{2}$.

In operation, an input carrier having a specified deviation is directed to the band pass filter whose bandwidth is suitable for that deviation, and the input signal is translated to the frequency of this band-pass filter. In this manner, a carrier of almost any frequency and deviation can be directed to the correct translator stage operative to demodulate the input signal. The reference signal has frequency higher than the center frequency of the band-pass filter of a particular translator stage by a factor 1 +1/M so that the translator difference frequency is 1/M times the band pass filter frequency, this frequency corresponding to the center frequency of the next succeeding group of filters.

To demodulate a particular input carrier signal, a selected group of frequency translator stages is activated under the government of control logic 16 to provide the necessary translation of the input signal such that the frequency of the translated signal applied to the band-pass filter of the last selected stage is suitable for that band-pass filter, this filter having the requisite bandwidth to accommodate the deviation of the input signal. After processing by the selected frequency translator stages, the signal is limited by limiter 12 and demodulated by detector 13. The demodulated signal is then low-pass filtered and amplified in filter/amplifier 14 to provide the intended output signal. The operation of detector 13 and filter/amplifier 14 are controlled by logic 16 in a manner and for reasons to be explained in detail hereinbelow. In general, the characteristics of detector 13 are controlled by logic 16 in accordance with certain input conditions, as are the characteristics of the output low-pass filter. The gain of amplifier 14 and the polarity of the output signal are controlled by logic 16 such that an output signal of uniform polarity and amplitude is provided for any number of translator stages employed. Reference frequency source 15 and detector 13 receive tape reference signals from a magnetic tape recorder, when such a recorder is in use, the reference signals being employed to compensate for variations in frequency caused by tape transport flutter. Telemetry data is often recorded on magnetic tape as the data is received from the transmitting site, the recorded data being subsequently processed at the pleasure of the user. Such recording of telemetered data provides a safeguard against loss of information due to decoding equipment malfunction. In some instances, as in certain missile and satellite experiments, data once lost is irretrievable and multiple recordings of received data are made to minimize the possibility of such loss. In a frequency modulated system, tape flutter can cause spurious frequency variations in the recorded signal which can distort the demodulated data. Such frequency variation is substantially reduced by use of a tape reference carrier which is recorded along with the received data and which varies in frequency correspondingly with that of the received data signal. The frequency of source 15 is varied by the tape reference carrier such that the frequency translation process takes into account the frequency error due to flutter, and a tape reference signal derived from the tape reference carrier is employed to vary the frequency of detector 13 such to cancel the spurious modulation.

Figure 2:
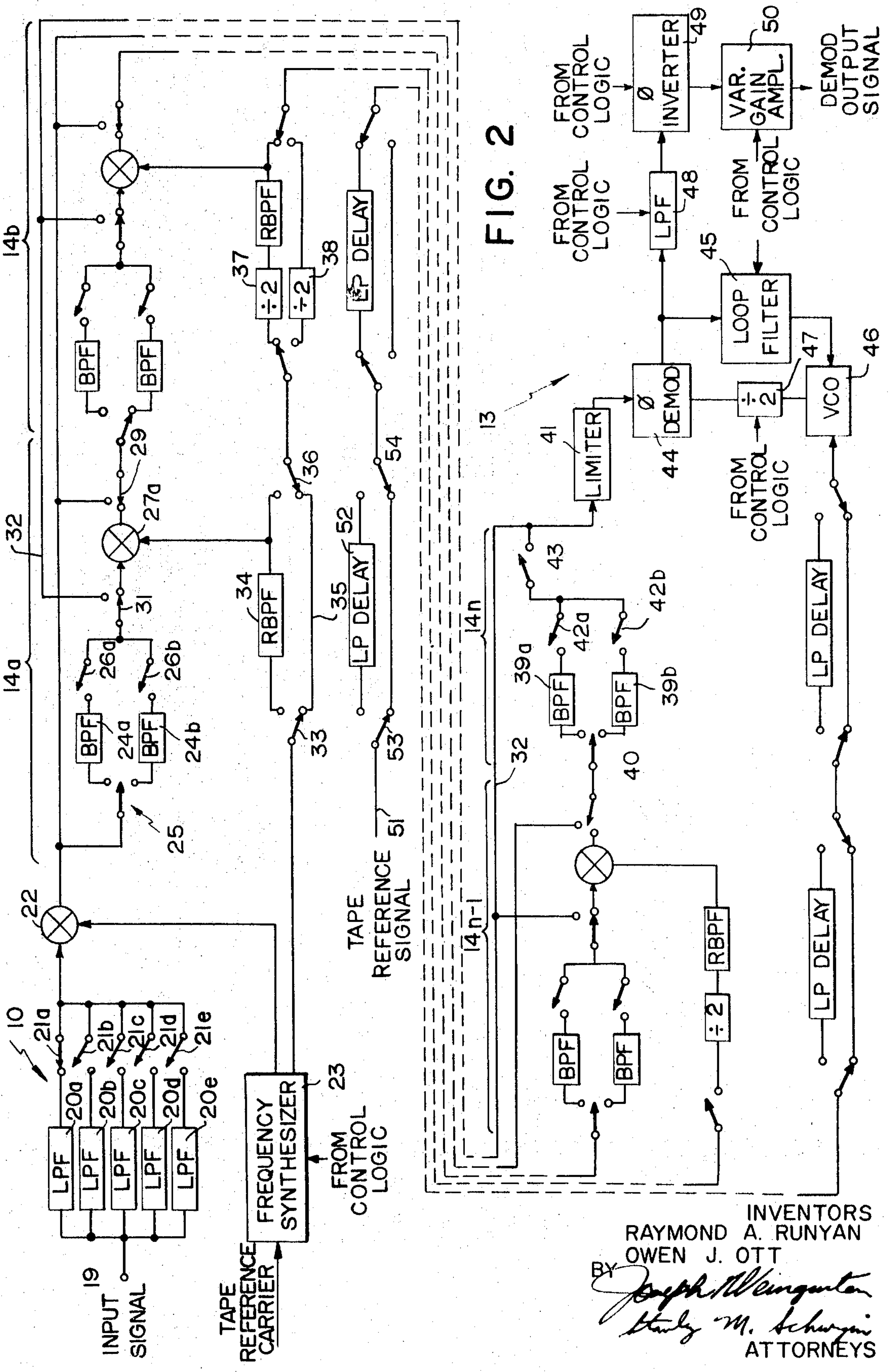
FIG. 2 is a more detailed block diagram of the demodulator of FIG. 1.

The demodulator system embodying the invention is illustrated more particularly in FIG. 2. The input filter 10 includes five low-pass filters 20*a* through 20*e*, each having its input connected to a common system input terminal 19 to which the input carrier signal is applied. The output of each low-pass filter is connected via a corresponding switch 21*a* through 21*e* to one input of a mixer 22, the other input of mixer 22 being connected to a frequency synthesizer 23 which provides a reference frequency for the translation process.

A plurality of cascaded frequency translator stages 14*a* through 14*n* is provided, each stage differs from an adjacent stage by a factor of 2. Each stage except the last stage 14*n* includes a pair of band-pass filters and a mixer. Stage 14*n* includes a pair of band-pass filters, the output of which is subsequently processed in the system.

Referring to stage 14*a* of FIG. 2, there is shown a pair of band-pass filters 24*a* and 24*b*, the inputs of which are selectively connected by means of a switch 25 to the output of mixer 22 . The outputs of filters 24*a* and 24*b* are connected by means of respective switches 26*a* and 26*b* to an input of a mixer 27*a*. A switch 29 is provided in the output of mixer 27*a* to bypass mixer 27*a* in the event that this mixer is not employed in a particular instance. By means of switch 29, the band-pass filter of stage 14*b* can be connected to the output of mixer 27*a* or to the output of mixer 22, as desired. A further switch 31 is provided between the output of filters 24*a* and 24*b* and the input of mixer 27*a*, switch 31 being operative to either direct signal to the mixer or to an output line 32 for transmission to the phase demodulator 44. Thus, the switches are operative to select a particular band-pass filter of the stage or to bypass the band-pass filters of that stage and to also selectively connect the mixer. Switches 25, 26, 29 and 31 are electronic switches, typically transistor switches, the operation of which is governed by control logic 16. A control word generated by the logic represents a particular set of switch conditions and the logic is operative to correspondingly activate the switches.

The reference frequency for the mixer 27*a* is derived from frequency synthesizer 23 and is 1.5 times the center frequency of the band-pass filters of the stage, such that the output of the mixer is half of the input center frequency. The reference frequency is applied from frequency synthesizer 23 by means of a switch 33 to a reference filters filter 34 and thence to the second input of mixer 27*a*. Switch 33 is also operative to direct the reference signal through a bypassing path 34 or the bypass path 35 is the reference circuitry of the succeeding stage 14*b*. The reference signal applied to the mixers of stages 14*b* through 14*n*–1 are divided by 2 so that the reference frequency applied to each mixer is always 1.5 times the center frequency of the band-pass filters associated with that mixer. For example, in stage 14*b*, reference frequency division is accomplished by divider 37 or 38 depending upon which divider is operative for a particular processing sequence. The reference band-pass filter 34 is operative to delay the reference signal such that the reference signal and the carrier signal are generally coherent to achieve proper frequency translation. The center frequency of the band-pass pass of each stage is an octave higher than the corresponding center frequency of the next succeeding stage and, since the reference frequency is always three halves the center frequency of the associated stage, the output of the mixer of each stage is an octave lower than the input center frequency and is, therefore, the correct frequency to drive the succeeding stage.

The final filter stage $14n$ includes a pair of band-pass filters $39a$ and $39b$, the inputs of which can be selectively connected to the output of the preceding stage $14n-1$ by means of a switch 40. The outputs of the filters can be selectively coupled to a limiter 41 by means of switches 42a, 42b and 43, when this stage is employed as the final stage of a selected group of stages.

The output stage 13 is operative to provide the actual demodulation of the previously processed carrier signal to produce the intended system output. The output stage includes a limiter 41, the output of which is connected to one input of a phase demodulator 44, the other input of which is derived from a phase-lock loop including loop filter 45, voltage controlled oscillator 46 and divider circuit 47. The output of phase demodulator 44 is applied to a programmable low-pass filter 48, the output of which is applied to a programmable phase inverter 49 whose output is applied to a variably gain amplifier 50. The output of amplifier 50 is the intended demodulated output signal. The characteristics of loop filter 45 and divider circuit 47 are adjusted under the control of logic 16 depending upon the number of translator stages employed during a particular demodulator operation. Similarly, low-pass filter 48 is controlled by logic 16 depending upon the particular processing seauence. Phase inverter 49 is operative under the government of logic 16 to selectively invert the signal applied to amplifier 50 as a function of the number of inversions of the signal caused by the multiple translation process. The phase demodulator 44 produces an output voltage, the magnitude of which varies with the full scale deviation of the input signal. Variably gain amplifier 50 is employed in the present system to provide an output voltage of constant magnitude for any selected full scale input deviation, and the gain of amplifier 50 is varied under the control of logic 16 to achieve this result. In the illustrated system, each stage is of unity gain and thus the gain of a signal being processed will remain essentially constant irrespective of the number of stages employed in a particular sequence. In some implementations of the invention, however, each stage may have positive gain, and if uniform output gain were desired, the output signal would have to be compensated to provide such uniform gain regardless of the different number of stages employed. A variable gain amplifier, in this latter case, employed before the limiter 41, can provide suitably gain compensation which will depend upon the particular processing sequence.

As mentioned hereinabove, telemetry data is often initially recorded on magnetic tape and then demodulated from the stored version of the data. The present system is operative to demodulate signals recorded on a tape or other magnetic storage medium and to compensate for flutter caused by speed variations of the tape transport. A reference carrier recorded on the tape along with the telemetry data, or a signal derived from such reference carrier, is applied to frequency synthesizer 23 to cause the synthesizer output frequency to vary by the same percentage as the tape speed. In addition, a DC reference signal derived from the reference carrier is applied via line 51 to voltage controlled oscillator 46, the reference signal varying in magnitude in accordance with the frequency variation of the data signal and operative to tune the center frequency of oscillator 46. Frequency translation is thus effected in a manner which tracks the spurious frequency variation and oscillator 46 is returned by an amount such to cancel the frequency error.

A low-pass delay network 52 is provided in each translator stage and this delay can be inserted into the tape reference signal path by means of switches 53 and 54. Such delay is employed when a particular stage is operative to delay the tape reference signal by substantially the same amount as the delay caused by the translator circuitry so that properly phased signals are applied to the phase-lock loop. The narrower band-pass filters are employed in the operative stages, except in the last operative stage wherein either the wider or narrower filter is employed depending upon the deviation of the input signal, and the time delays of paths 52 are matched to the time delays of the narrower filters of corresponding stages. The delay is inversely proportional to the bandwidth of the filters. More particularly, the delay of a wider filter $Tw$ is equal to the delay of a narrower filter $Tn$ divided by $\sqrt{2}(Tw=Tn/\sqrt{2})$. When five stages of translation are employed , with the wider filter operative in the final stage, four delay paths 52 are utilized provide the necessary total delay. When the narrower filter is utilized in the five stage group, six delay paths 52 are employed to achieve the intended total delay. Flutter components usually are present at frequencies up to 2 kHz. At deviations above this frequency, delay compensation is no critical so long as the compensation provides acceptably phase accuracy for the frequency components up to 2 kHz.

In the illustrated system, the operative system frequencies are of values that are suitable for binary coded decimal conversion. The carrier frequencies are powers of two, as are the wider filter bandwidths. The narrower filter bandwidths are powers of two divided by $\sqrt{2}$. The system frequencies and filter bandwidths for a 13 stage demodulator of the type illustrated in FIG. 2 is given in the following table, this demodulator being operative for center frequencies to 1.5 MHz. and deviations of 30 Hz.–250 kHz.

TABLE

| Translator Stage | Center Frequency (Hz.) | Filter Bandwidth (Hz.) |
|---|---|---|
| $14_1$ | 2,097,152 | ±262,144<br>±185,364 |
| $14_2$ | 1,048,576 | ±131,072<br>±92,682 |
| $14_3$ | 524,288 | ±65,536<br>±46,341 |
| $14_4$ | 262,144 | ±32,768<br>±23,171 |
| $14_5$ | 131,072 | ±16,384<br>±11,585 |
| $14_6$ | 65,536 | ±8,192<br>±5,793 |
| $14_7$ | 32,768 | ±4,096<br>±2,896 |
| $14_8$ | 16,384 | ±2,048<br>±1,448 |
| $14_9$ | 8,192 | ±1,024<br>±724 |
| $14_{10}$ | 4,096 | ±512<br>±362 |
| $14_{11}$ | 2,048 | ±256<br>±181 |
| $14_{12}$ | 1,024 | ±128<br>±91 |
| $14_{13}$ | 512 | ±64<br>±45 |

Table – Continued

| Input Low-Pass Filter | Cutoff Frequency (kHz.) | Stages |
|---|---|---|
| 20*a* | 1,916 | 1-5 |
| 20*b* | 960 | 6, 7 |
| 20*c* | 240 | 8, 9 |
| 20*d* | 60 | 10, 11 |
| 20*e* | 15 | 12, 13 |

The number of frequency translations required to provide a suitable signal for demodulation is dependent upon the magnitude of the deviation of the input signal. In the present system, for deviations less than 8,192 Hz. five stages of translation are employed, and as each stage differs in frequency from the next by one octave, the signal into the five stage group is five octaves or 32 times higher than the signal from the group. The images and spectral folding components are, therefore, translated five octaves further from the spectrum of interest. When the deviation exceeds 8,192 Hz., there are not sufficient stages to provide five translations; however, five translations are not necessary at the higher deviations since no image components are present at these higher deviations which can fold into the spectrum of interest since the signal spectrum is limited to signals below 1.5 MHz. For wider and wider deviations, the number of translations decreases according to the number of available translator stages.

The illustrated system having the operating frequencies specified in the Table, is operative with center frequencies up to 1.5 MHz., and deviations for 30 Hz. to 250 kHz., which correspond to percentage deviations of 1 percent to 25 percent. As an example of the processing of a typical signal, assume an 85 kHz., carrier having a 4 kHz., deviation is to be demodulated. A band-pass filter having a bandwidth sufficient for this deviation must be selected and the carrier must be converted to the center frequency of this filter. From the foregoing table, it is evident that a band pass filter in stage $14_7$ has a bandwidth of 4,096 Hz., which can accommodate the 4 kHz., and since five stages of translation are to be employed to prevent spectral folding, the signal into the five stage group must be five octaves higher than 32,768 Hz., namely, 1,048,576 Hz. Stages $14_3$–$14_7$ are employed and the appropriate switches are activated under the control of logic 16 to provide the required interconnections. The narrower filters of each operative stage are used except in the final stage where the narrower or wider is employed to suit the deviation in question. In the present example, the wider filter is used. Frequency synthesizer 23 provides a signal to the mixer of stage 13, such that a mixer output frequency of 1,048,576 Hz., is produced. The frequency deviations of carrier signals, other than the carrier to be demodulated, may occupy the spectrum of the selected carrier, and the input low-pass filters are operative to minimize image distortion which can result. Filter **20*a* is associated with translator stages $14_1$–$14_5$, filter 20*b* with stages $14_6$ and $14_7$, 20*c* with $14_8$ and $14_9$, 20*d* with $14_{10}$ and $14_{11}$, and 20*e* with $14_{12}$ and $14_{13}$. One of the input low-pass filters 20*a* –20*e* is selected which can pass the highest carrier frequency whose minimum deviation, 1 percent in the illustrated system, corresponds to the bandwidth of the selected band-pass filter. In the present example, the selected band pass filter has a bandwidth of 4,096 Hz., and the highest carrier frequency, the 1 percent deviation of which is 4,096 Hz., would be approximately 400 kHz. Thus, the filter 20 *b*** having a cutoff frequency of 960 kHz., is employed.

Figure 3:
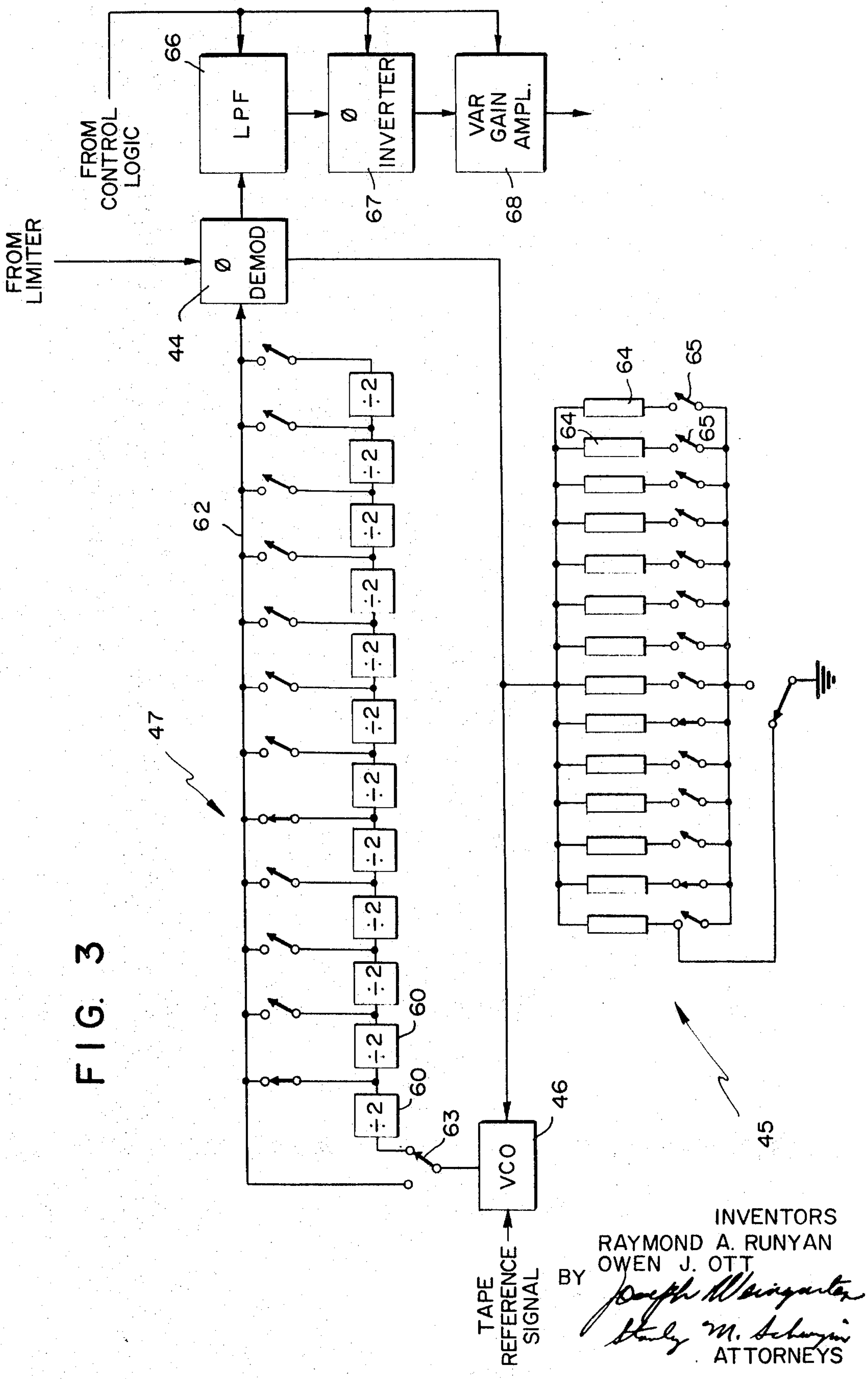
FIG. 3 is a block diagram of the output stages of FIG. 2.

The phase-lock loop and the output circuitry is illustrated more particularly in FIG. 3. The phase-lock loop includes phase demodulator 44, loop filter 45, voltage controlled oscillator 46, and frequency divider 47. The oscillator center frequency corresponds to the center frequency of the filter stage having the largest bandwidth; namely 2,097,152 Hz., in the exemplary system. A plurality of octave dividers 60 are provided which can be connected, singly or in cascade, by means of respective switches 61, each having a terminal connected to a common output line 62 which is connected to one input of phase demodulator 44. A switch 63 is operative to connect oscillator 46 directly to output line 62 or to the divider chain 60, as desired. Switches 61 and 63 are typically transistor switches operable by control logic 16. The number of dividers 60 are activated as are necessary to provide a frequency equal to the center frequency of the band pass filter corresponding to the input signal deviation. For a given loop bandwidth, the loop characteristics are adjusted accordingly by programmable loop filter 45 which includes a plurality of filter sections 64 which can be selectively connected within the loop by respective switches 65, which typically are also transistor switches.

The output of phase demodulator 44 is applied to a programable low-pass filter 66, whose frequency characteristics are determined by control logic 16 according to the selected input conditions. The control logic 16 is operative in accordance with input conditions determined by manual selector 17 or computer selector 18 to set up a set of switch conditions suitable for the selected input. The control logic is operative to determine the synthesizer frequency, to select particular translator stages, to select the wider or narrower filter of the final selected stage, to determine the cutoff frequency of the input low-pass filter, to determine the characteristics of the output low-pass filter and phase-lock loop filter, to select the requisite division scale for the phase-lock loop, to select the output signal polarity and to control the gain of the output amplifier. In addition, the number of low-pass delays are activated as are necessary to match the tape reference signal delay with the delay of the data signal. The input conditions selected manually or by computer are the carrier frequency and the deviation of an input signal to be processed. The cutoff frequency of the output low-Pass filter is also usually preset. From these input conditions, digital words are generated by well-known means which are operative to energize the appropriate switches in the system to accomplish the intended interconnections.

In general several telemetry subcarriers are multiplexed onto a main carrier for transmission to a receiver. The individual subcarriers are detected and the data content of the several subcarriers are then demodulated to obtain transmitted information. The present demodulator can be utilized in a scanning mode to sample a plurality of subcarriers for the sequential demodulation thereof. For example, under suitable computer control a plurality of predetermined input conditions can be derived corresponding to a plurality of subcarriers of a multiplex and a single demodulator can in response to such control sequentially process each of the subcarriers of the multiplex. Of course, the sampling rate would have to be compatible with the date rates employed to provide useful data decoding. Alternatively, a single demodulator is employed with each subcarrier of a multiplex and these demodulators operate concurrently to process their respective signals.

While the invention has been shown as employed in an FM demodulation system, the invention is in no way limited to such application. As mentioned hereinabove, the novel frequency translation described herein is broadly useful in many applications in which frequency conversion with minimum distortion is required. One such application is in spectrum analysis wherein a frequency band of interest is scanned to ascertain the signal content thereof. In addition, variations in the circuitry embodied in the present invention will occur to those versed in the art. Accordingly, it is not intended to limit the invention by what has been particularly shown and described except as indicated in the appended claims.

We claim:

1. A frequency translation system comprising:

a plurality of frequency translator stages, each stage having a group of *n* band-pass filters and a mixer adapted to be selectively coupled to said band-pass filters, the center frequency of each stage being related to the center frequency of the adjacent stage by a factor M, the bandwidths of the filters in each group differing by $M^{1/n}$;

control means coupled to said frequency translator stages for selecting predetermined ones of said stages and for selecting a predetermined one of said filters in each selected stage;

means coupled to said stages for applying an input signal to the selected one of the filters of said first selected stage; and means for providing a reference signal to said mixers such that the output signal of each mixer is the center frequency of the succeeding stage.

2. A frequency translation system according to claim 1 wherein M and *n* each equal 2.

3. A frequency translation system according to claim 1 wherein said reference signal applied to each mixer is of a frequency 1 +1/M higher than the center frequency of the respective stages 4. A frequency translation system according to claim 1 wherein said reference signal means includes means for delaying said reference signal by an amount such to maintain predetermined phase coherence between said reference signal and said input signal being processed.

5. A frequency translation system according to claim 1 wherein said reference signal means includes means for providing a reference signal of a master frequency, and means for dividing said master frequency to a frequency 1 +1/M higher than the center frequency of each stage.

6. A demodulation system comprising:

a plurality of frequency translator stages, each stage having a group of *n* band-pass filters, the center frequency of which is related to the center frequency of the adjacent group of band-pass filters by a factor M, the bandwidths of the filters in each group differing by $M^{1/n}$;

control means coupled to said frequency translator stages for selecting predetermined ones of said stages and for selecting a predetermined one of said filters in each selected stage;

means coupled to said stages for applying a modulated input signal to the selected filter of the first selected stage;

means in cooperative association with said stages for heterodyning said input signal to the center frequency of the selected filter whose bandwidth corresponds to the deviation of the input signal and for applying said heterodyned signal to said selected filter; and means coupled to the last selected stage for providing an output signal representative of the data content of said modulated input signal.

7. A demodulation system according to claim 6 wherein said heterodyning means includes:

means for providing a reference signal;

a mixer associated with each pair of adjacent stages, one input to each mixer being a signal from the selected filter of one of said pair of adjacent stages, the other input being said reference signal which is of a frequency such that the mixer output signal is of a frequency equal to the center frequency. of the other of said pair of adjacent stages.

8. A demodulation system according to claim 6 wherein said input signal means includes a programmable input low-pass filter having a selectably cutoff frequency related to the deviation of an input signal.

9. A demodulation system according to claim 6 wherein said output signal means includes a limiter and a phase demodulator.

10. A demodulation system according to claim 6 further including means for selectively inverting the output signal in accordance with the number of stages selected, thereby to provide an output signal of uniform polarity irrespective of the number of states selected.

11. A demodulation system according to claim 10 wherein said selective inverting means is part of said control means.

12. A demodulation system comprising:

a programmable input low-pass filter;

means for applying a modulated input signal to said input filter;

a multistage frequency translator, coupled to said input filter including in each stage a group of band-pass filters and a mixer, means for connecting a selected one of said filters to said mixer, said mixer being operative to provide in response to said input signal, an output signal of a frequency to drive the succeeding stage;

means coupled to said translator for selecting a cascade of stages within said translator, whereby said input signal is directed to processing selected filter whose bandwidth corresponds to the deviation of said input signal; and means coupled to the last selected stage within said translator for decoding the data content of said modulated input signal after processing by said translator.

13. An FM demodulation system according to claim 6 wherein said output signal means includes:

a limiter coupled to the last selected stage;

a phase lock loop coupled to the output of said limiter and having a phase demodulator, a programmable loop filter, a voltage controlled oscillator and a programmable frequency divider;

control means for causing said frequency divider to provide a frequency equal to the center frequency of the selected filter corresponding to the input signal deviation; and control means for adjusting the characteristics of said loop filter in accordance with input signal conditions.

14. An FM demodulation system according to claim 13 further including:

a programmable low-pass filter coupled to the output of said phase lock loop and having selectable characteristics corresponding to the input signals conditions;

an inverter coupled to said programmable low-pass filter for selectively inverting said output signal in accordance with the number of stages selected; and a variable gain amplifier coupled to said inverter and operative to provide an output voltage of constant magnitude for any selected full scale input deviation.

15. A demodulation system according to claim 13, further including:

tape speed compensation means including:

means for providing a tape reference signal representative of frequency variations of said input signal caused by tape speed variation;

means for delaying said tape reference signal by an amount such to maintain predetermined phase coherence between said tape reference signal and the signal being processed; and means for adjusting the frequency of the phase lock loop such that frequency error due to tape speed variation is cancelled.

16. An FM demodulation system according to claim 13, further including:

tape speed compensation means including means for providing a tape reference signal representative of frequency variations of said input signal caused by tape flutter;

means for delaying said tape reference signal by an amount such to maintain predetermined phase accuracy between said tape reference signal and the signal being processed; and means operative in response to said delayed tape reference signal for varying the frequency of said voltage controlled oscillator such to cancel said tape flutter frequency variations.

17. A demodulation system according to claim 7 wherein said reference signal means includes:

means for providing a reference signal of a master frequency, and means for dividing said master frequency to a frequency 1+1/M higher than the center frequency of each stage.

18. An FM demodulation system comprising:

a programmable input low-pass filter having selectable characteristics corresponding to input signal conditions, and adapted to receive an input frequency modulated carrier signal to be processed;

a frequency synthesizer operative to provide a first reference signal of predetermined frequency;

a wide-band mixer adapted to receive a signal from said input low-pass filter and from said frequency synthesizer and to provide in response thereto a signal of a frequency higher than the frequency of said input signal by a predetermined amount;

a plurality of frequency translator stages, each stage having a group of nband-pass filters and a mixer, the center frequency of which is related to the center frequency of the adjacent group by a factor M, the bandwidths of the filters in each group differing by $M^{1/n}$;

control means coupled to said frequency translator stages for selecting predetermined adjacent ones of said stages and for selecting a predetermined one of said filters in each selected stage, the last selected stage having only a group of band-pass filters associated therewith;

means for applying the signal from said wide-band mixer to the selected filter of the first selected stage;

means operative in response to said first reference signal to provide a reference signal to each mixer of said selected stages of a frequency such that the output signal of each such mixer is the center frequency of the succeeding stage; and output means operative in response to the signal from said selected filter of said last selected stage to detect the data content of said input modulated carrier signal.

19. An FM demodulation system according to claim 18 wherein M and *N* each equal 2, and the reference signal applied to each mixer of said selected stages is of a frequency 1 +3/M higher than the center frequency of the respective stages.

20. An FM demodulation system according to claim 18 wherein said reference signal means includes, for each stage, a delay path, whereby the reference signal for each selected stage is generally coherent with said input signal being processed.

21. An FM demodulation system according to claim 18 wherein said reference signal means includes, for each stage, a frequency divider operative to divide said first reference frequency such that the output signal of each mixer of each selected stage is of a frequency equal to the center frequency of the succeeding selected stage.

22. An FM demodulation system according to claim 18 wherein said output means includes an inverter operative in accordance with said control means for selectively inverting the signal from said output means thereby to provide an output signal of uniform polarity irrespective of the number of stages selected.

23. An FM demodulation system according to claim 18 wherein said output means includes:

a limiter coupled to said last selected stage;

a phase-lock loop coupled to the output of said limiter and having a phase demodulator, a programmable loop filter, a voltage controlled oscillator and a programmably frequency divider;

control means for adjusting said frequency divider to provide a loop frequency equal to the center frequency of the last selected stage;

control means for adjusting the characteristics of said loop filter in accordance with input conditions of said modulated input signal;

a programmable output low-pass filter coupled to the output of said phase-lock loop and having selectably characteristics corresponding to input signal conditions;

an inverter coupled to the output of said programmable output low-pass filter and operative to selectively invert the output signal from said output low-pass filter to provide an output signal of uniform polarity irrespective of the number of stages selected; and a variable gain amplifier coupled to said inverter and operative to provide an output signal of constant magnitude for any selected full scale deviation of said modulated input signal.

24. An FM demodulation system according to claim 23 further including:

means for providing a tape reference signal whose frequency varies correspondingly with frequency variations of said input signal caused by tape speed variation;

means for providing a phase coherent error signal representative of said tape speed variation, said error signal being operative to adjust the frequency of said voltage controlled oscillator such to cancel frequency variations caused by tape speed variation.

25. An FM demodulation system according to claim 23, further including:

tape speed compensation means comprising:

means for providing a tape reference signal representative of frequency variations of said input signal caused by tape speed variation;

means operative in response to said tape reference signal to correspondingly vary the frequency of said first reference signal;

means for delaying said tape reference signal by an amount such to maintain predetermined phase coherence between said tape reference signal and the signal being processed; and means for adjusting the frequency of the phase-lock loop such that frequency error due to tape speed variation is cancelled.

UNITED STATES PATENT OFFICE

CERTIFICATE OF CORRECTION

Patent No. 3,614,627 Dated October 19, 1971

Inventor(s) Raymond A. Runyan, Owen J. Ott

It is certified that error appears in the above-identified patent and that said Letters Patent are hereby corrected as shown below:

Column 2, line 36, "trollably" should read --trollable--.

Column 2, line 36, "suitably" should read --suitable--.

Column 2, line 39, "adjustably" should read --adjustable--.

Column 2, line 42, "suitably" should read --suitable--.

Column 3, line 20, after "pass" insert --filters--.

Column 3, line 35, after "each" insert --stage--.

Column 4, line 28, after "stage" insert --being similar to the others except that the frequency of each stage--.

Column 4, line 62, change "filters" to --bandpass--.

Column 4, line 65, change "is" to --to--.

Column 5, line 1, change "pass" (second occurrence) to --filters--.

Column 5, line 25, "variably" should read --variable--.

Column 5, line 39, "Variably" should read --Variable--.

Column 5, line 52, "suitably" should read --suitable--.

UNITED STATES PATENT OFFICE

CERTIFICATE OF CORRECTION

Patent No. 3,614,627 Dated October 19, 1971

Inventor(s) Raymond A. Runyan, Owen J. Ott

It is certified that error appears in the above-identified patent and that said Letters Patent are hereby corrected as shown below:

Column 6, line 14, after "utilized" insert --to--.

Column 6, line 19, "no" should be --not--.

Column 6, line 20, "acceptably" should read --acceptable--.

Column 7, line 34, after "kHz." (first and second occurrences), delete the commas.

Column 7, line 39, after "4 kHz." insert --deviation. The center frequency of this stage is 32768 Hz--.

Column 7, line 46, after "wider" insert --filter--.

Column 8, line 33, "low-Pass" should be --low-pass--.

Column 9, line 60, "selectably" should be --selectable--.

RM PO-1050 (10-69)

USCOMM-DC 60376-P69
☆ U.S. GOVERNMENT PRINTING OFFICE : 1969 O—366-334

UNITED STATES PATENT OFFICE

CERTIFICATE OF CORRECTION

Patent No. 3,614,627 Dated October 19, 1971

Inventor(s) Raymond A. Runyan, Owen J. Ott

It is certified that error appears in the above-identified patent and that said Letters Patent are hereby corrected as shown below:

Column 10, line 9, change "processing" to --a--.

Column 10, line 30, change "signals" to --signal--.

Column 11, line 9, change "nband-pass" to --n bandpass--.

Column 11, line 29, change "N" to --n--.

Column 11, line 31, "+3/M" should read --$+\frac{1}{M}$--.

Column 12, line 14, "selectably" should read --selectable--.

Signed and sealed this 2nd day of May 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
☆ U.S. GOVERNMENT PRINTING OFFICE : 1969 O—366-334